United States Patent
Stephan et al.

(10) Patent No.: US 7,918,418 B2
(45) Date of Patent: Apr. 5, 2011

(54) DEVICE FOR INTRODUCING AND DISTRIBUTING FORCES INTO OR INSIDE A LUGGAGE COMPARTMENT

(75) Inventors: Walter Stephan, St. Martin (AT); Erich Pamminger, Weilbach (AT)

(73) Assignee: FACC AG, Ried im Innkreis (AT)

( * ) Notice: Subject to any disclaimer, the term of this patent is extended or adjusted under 35 U.S.C. 154(b) by 368 days.

(21) Appl. No.: 10/581,275

(22) PCT Filed: Nov. 4, 2004

(86) PCT No.: PCT/AT2004/000389
§ 371 (c)(1),
(2), (4) Date: Jun. 1, 2006

(87) PCT Pub. No.: WO2005/054054
PCT Pub. Date: Jun. 16, 2005

(65) Prior Publication Data
US 2008/0210814 A1    Sep. 4, 2008

(30) Foreign Application Priority Data

Dec. 1, 2003 (AT) ................ A 1918/2003

(51) Int. Cl.
*B64D 11/00* (2006.01)
(52) U.S. Cl. .............. 244/118.5; 244/118.1; 312/245
(58) Field of Classification Search .............. 244/118.1, 244/118.5, 137.2; 105/325, 239.1, 344; 296/37.8; 312/242, 245
See application file for complete search history.

(56) References Cited

U.S. PATENT DOCUMENTS

| | | | | |
|---|---|---|---|---|
| 3,102,607 | A | * | 9/1963 | Roberts ................... 186/40 |
| 3,827,772 | A | * | 8/1974 | Johnson ................... 312/7.1 |
| 4,275,942 | A | * | 6/1981 | Steidl ...................... 312/266 |
| 4,927,200 | A | * | 5/1990 | Wilkins ................... 296/37.8 |
| 5,108,048 | A | * | 4/1992 | Chang .................... 244/118.1 |
| 5,282,556 | A | * | 2/1994 | Bossert ................... 224/540 |
| 5,441,326 | A | * | 8/1995 | Mikalonis ............... 296/208 |
| 5,456,529 | A | * | 10/1995 | Cheung ................... 312/245 |
| 5,687,929 | A | * | 11/1997 | Hart et al. .............. 244/118.1 |
| 5,788,349 | A | | 8/1998 | DeMaine et al. |
| 5,817,409 | A | * | 10/1998 | Stephan et al. ........... 428/219 |
| 5,839,694 | A | * | 11/1998 | Bargull et al. ........... 244/118.1 |
| 5,842,668 | A | * | 12/1998 | Spencer .................. 244/118.1 |
| 5,988,565 | A | * | 11/1999 | Thomas et al. .......... 244/118.1 |
| 6,045,204 | A | * | 4/2000 | Frazier et al. ............ 312/247 |
| 6,062,509 | A | | 5/2000 | Burrows et al. |
| 6,398,163 | B1 | * | 6/2002 | Welch et al. ............ 244/118.1 |

(Continued)

FOREIGN PATENT DOCUMENTS

| | | |
|---|---|---|
| DE | 200 16 405 | 3/2002 |
| EP | 0 514 957 A1 | 11/1992 |
| EP | 0 658 644 A2 | 6/1995 |
| EP | 0 718 189 A1 | 6/1996 |
| WO | WO 03/031260 A1 | 4/2003 |

*Primary Examiner* — Tien Dinh
*Assistant Examiner* — Philip J Bonzell
(74) *Attorney, Agent, or Firm* — Jacobson Holman PLLC

(57) ABSTRACT

A device for introducing forces into a luggage compartment and for transferring and/or distributing the forces and/or stresses in vehicles, particularly in fast traveling vehicles such as aircraft, ground vehicles and watercraft, e.g. express trains, speedboats and the like, has a ceiling-side connecting element arranged between extensions of end-side side walls of the luggage compartment. The device has a simple design and can be economically produced. The invention provides for the introduction of the forces into the luggage compartment via the ceiling-side connecting element, configured, for example, as a strip that distributes forces for stresses.

9 Claims, 6 Drawing Sheets

U.S. PATENT DOCUMENTS 7,097,138 B2 * 8/2006 Stephan et al. ............ 244/118.6
7,232,095 B2 * 6/2007 Park et al. .................. 244/118.6
2002/0175244 A1 * 11/2002 Burrows et al. ............ 244/118.1
2007/0084966 A1 * 4/2007 Haynes et al. ............. 244/118.1

* cited by examiner

DEVICE FOR INTRODUCING AND DISTRIBUTING FORCES INTO OR INSIDE A LUGGAGE COMPARTMENT

CROSS-REFERENCE TO RELATED APPLICATION

This is a nationalization of PCT/AT2004/000389 filed 4 Nov. 2004 and published in German.

BACKGROUND OF THE INVENTION

1. Field of Invention

The invention relates to an arrangement for introducing forces into a luggage stowage compartment and for transmitting and/or distributing the forces, or tensions, respectively, in vehicles, in particular in fast-traveling vehicles, such as aircraft, ground vehicles and watercraft, e.g. express trains, speedboats and the like.

Primarily, the invention relates to luggage stowage compartments of an aircraft, but also of other vehicles subjected to great changes in speed, by which the objects accommodated in the luggage stowage areas may become damaged.

2. Description of the Prior Art

So far, containers made of plate-shaped elements and serving as luggage stowage compartments have been provided with complex metallic force introduction elements, which have been fastened to reinforced parts of the wall structure of the container by gluing techniques or by means of screws or rivets. This technique has been heavy and complex.

Such overhead luggage stowage compartments for aircraft have been described by EP 514 957 A1 and by EP 718 189 A1, e.g.

SUMMARY OF THE INVENTION

The object of the invention consists in avoiding this disadvantage and in finding measures for a weight-saving solution. The arrangement shall be as simple and cost-effective as possible to produce.

According to the invention, this object is achieved in that the introduction and distribution of the forces to the luggage stowage compartment is effected via a ceiling-side connecting element which distributes the forces or tensions. The present invention provides an arrangement for introducing forces into a luggage stowage compartment, which arrangement can be produced with little expenditures in terms of work and costs. The connecting element serves for accommodating and/or damping and/or distributing the shearing and/or tensile and/or pressure forces and tensions, respectively. The ceiling-side connecting element thus relieves the ceiling wall and the side walls of the luggage stowage compartment.

There, the introduction of force preferably is effected directly into an extension of at least one end-side side wall of the luggage stowage compartment. Thus, the connecting element for transmitting the forces is integrated in the side wall of the luggage stowage compartment.

Preferably, the extension is formed by an upwardly projecting bracket.

On the extension of the side wall of the luggage stowage compartment, a force-introducing element, e.g. a bushing, a lug or the like, may be provided.

The said connecting element may be designed as a ledge, wall or the like which is fastened to the luggage stowage compartment at least two spots thereof so as to be unshiftable in the longitudinal direction thereof.

The connecting element has a reinforcing cross-section, e.g. an L-shaped cross-section. Yet also other cross-sections are possible, e.g. in the form of an I, Z, T, J or the like.

Preferably, the connecting element is glued to the luggage stowage compartment.

Preferably, the connecting element is integrated in the luggage stowage compartment.

According to a further feature of the invention, the connecting element is connected to the force-introducing element, preferably at least on one of its ends.

Furthermore, a bottom carrier may be provided on the bottom side of the luggage stowage compartment for receiving forces and their uniform distribution to the luggage stowage compartment.

Preferably, the connecting element is made of a fiber-reinforced synthetic material, in particular of a fiber-glass or carbon fiber-reinforced synthetic material.

Further features of the invention will be explained in more detail by way of the drawings in which an exemplary embodiment of a luggage stowage compartment is illustrated.

BRIEF DESCRIPTION OF THE DRAWINGS

Therein.

DETAILED DESCRIPTION OF THE PREFERRED EMBODIMENTS

Figure 1:
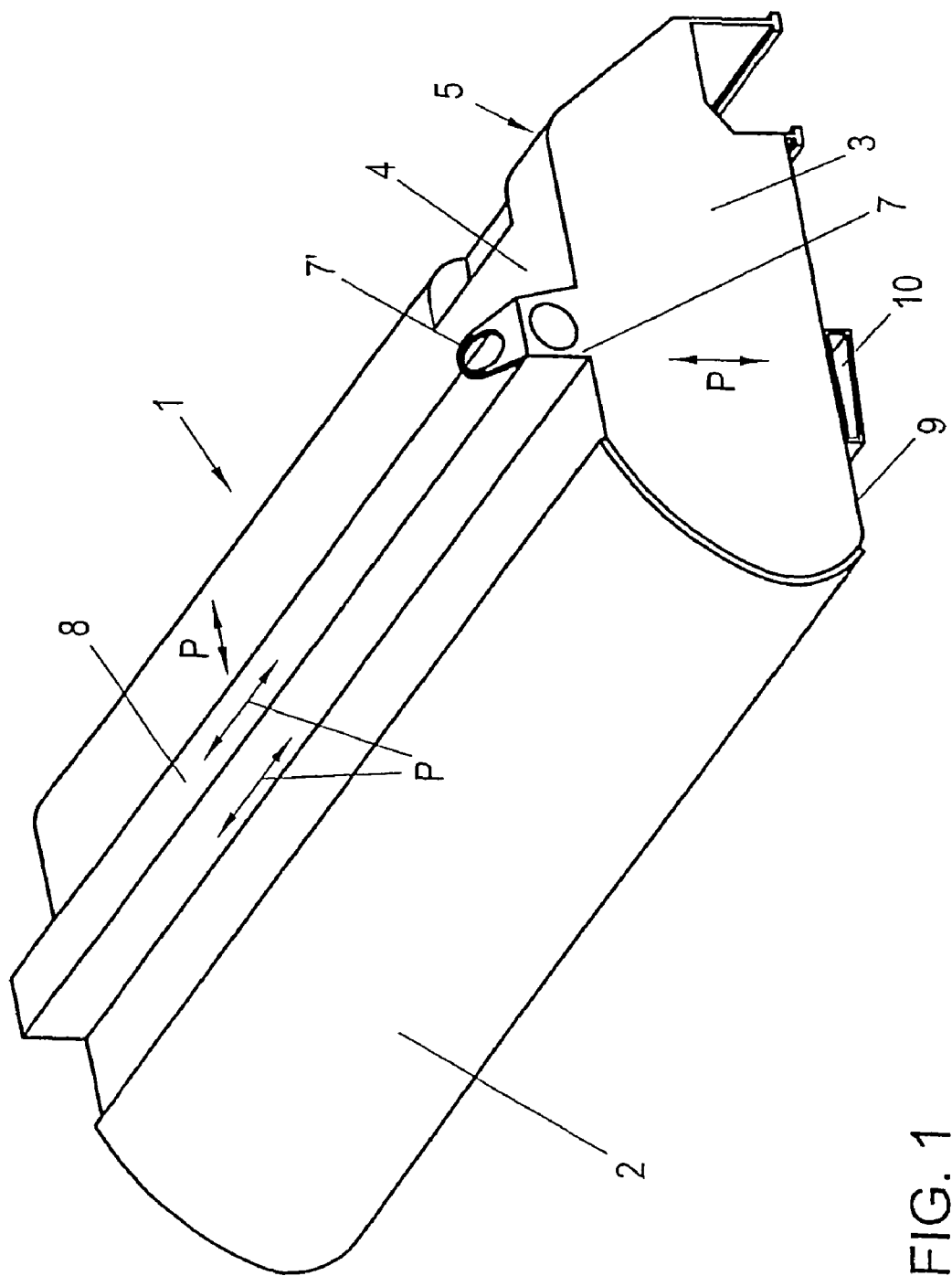
FIG. 1 shows a perspective view of a luggage stowage compartment, seen from the front-side.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The luggage stowage compartment 1 illustrated in FIGS. 1 to 8 comprises a pivot flap 2 capable of being opened for insertion and removal of hand luggage etc., one side wall 3 each to provide for a lateral closure of the luggage stowage compartment 1, one ceiling wall 4 and one downwardly stepped rear wall 5 which is followed by a horizontal fastening ledge 6.

The side walls 3 are provided with an upwardly projecting shoulder 7 which, together with the corresponding shoulder 7 of the oppositely located side wall 3, forms an upwardly projecting bracket 11 of, e.g., trapezoidal cross-section, to which in the present case a ledge 8 of L-shaped cross-section is fastened, preferably glued over its entire length, a horizontal leg of the ledge 8 resting on the substantially horizontal surface of the projection while the leg, which projects at a right angle, covers the consecutively arranged perpendicular wall 13 that faces the pivot flap 2.

The connecting element, in the present case the ledge 8, irrespective of the shape in which it is designed, can be made of fiber glass or carbon fiber, yet it may also be provided with other fiber-reinforced synthetic materials, metals, composite materials etc.

To introduce forces into the luggage stowage compartment 1, one of the projections 7 is provided with a bushing 7', a lug or the like. Of course, also a different equipment may be provided for the introduction of forces.

At the bottom 9 of the luggage stowage compartment 1, a bottom carrier 10, ledge or the like is fastened in parallel with the ledge 8, for instance also by gluing over the entire length of the luggage stowage compartment 1, which bottom carrier 10 has the same or a similar function as the ledge 8.

Figure 2:
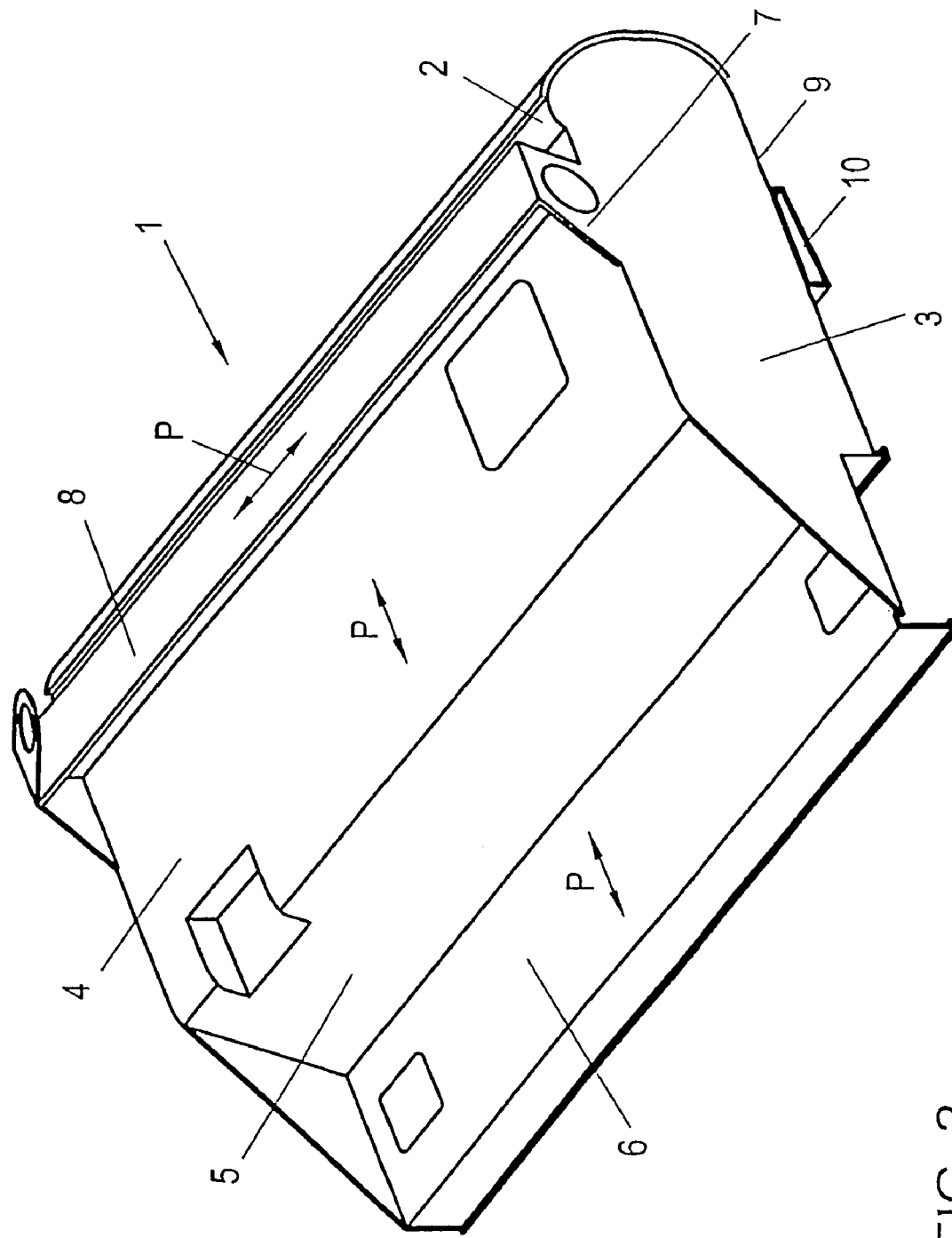
FIG. 2 shows a luggage stowage compartment according to FIG. 1, seen from the rear side.
Figure 2A:
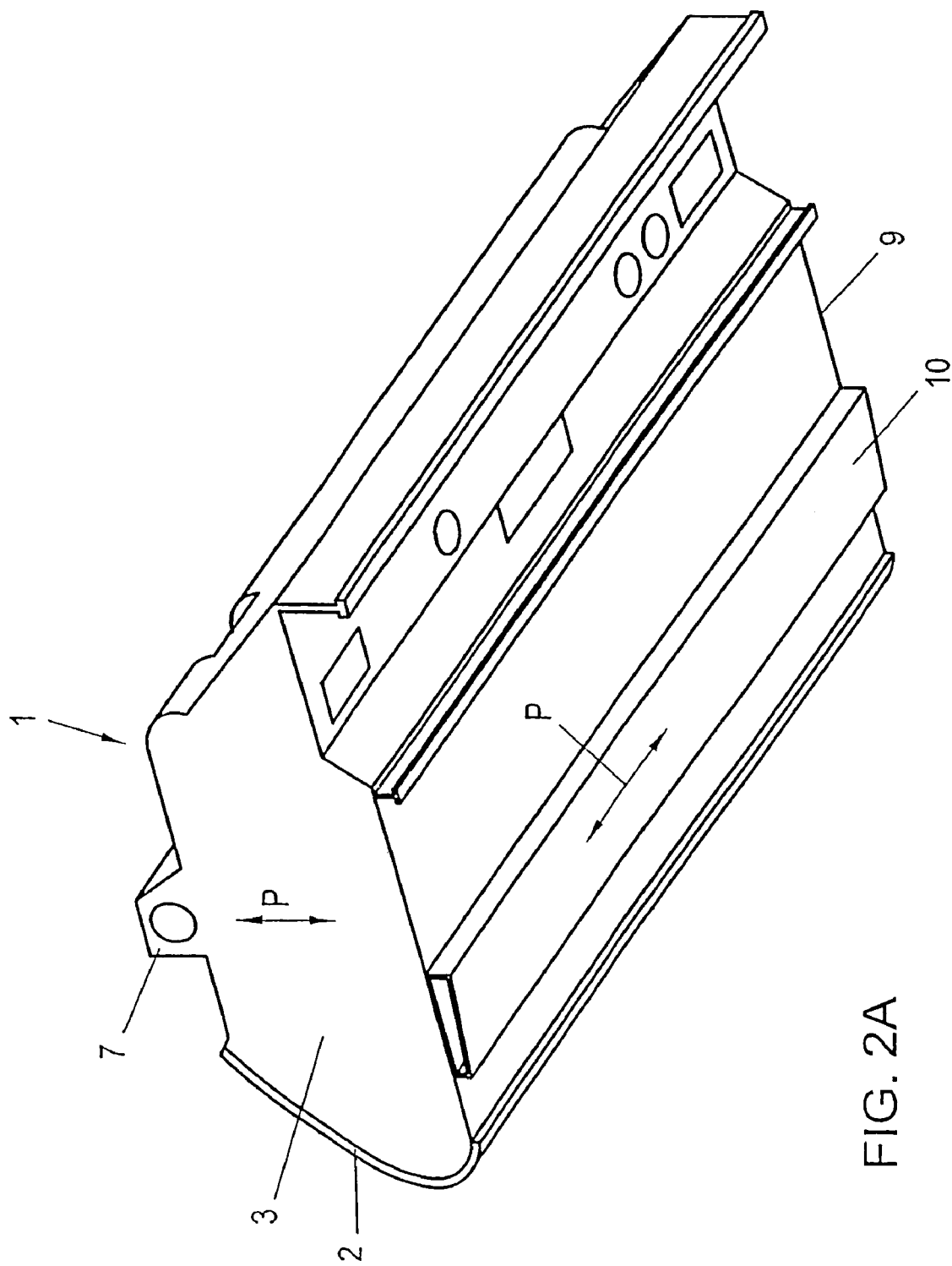
FIG. 2A shows a perspective view of the luggage stowage compartment according to FIG. 1, seen from below.
Figure 3:
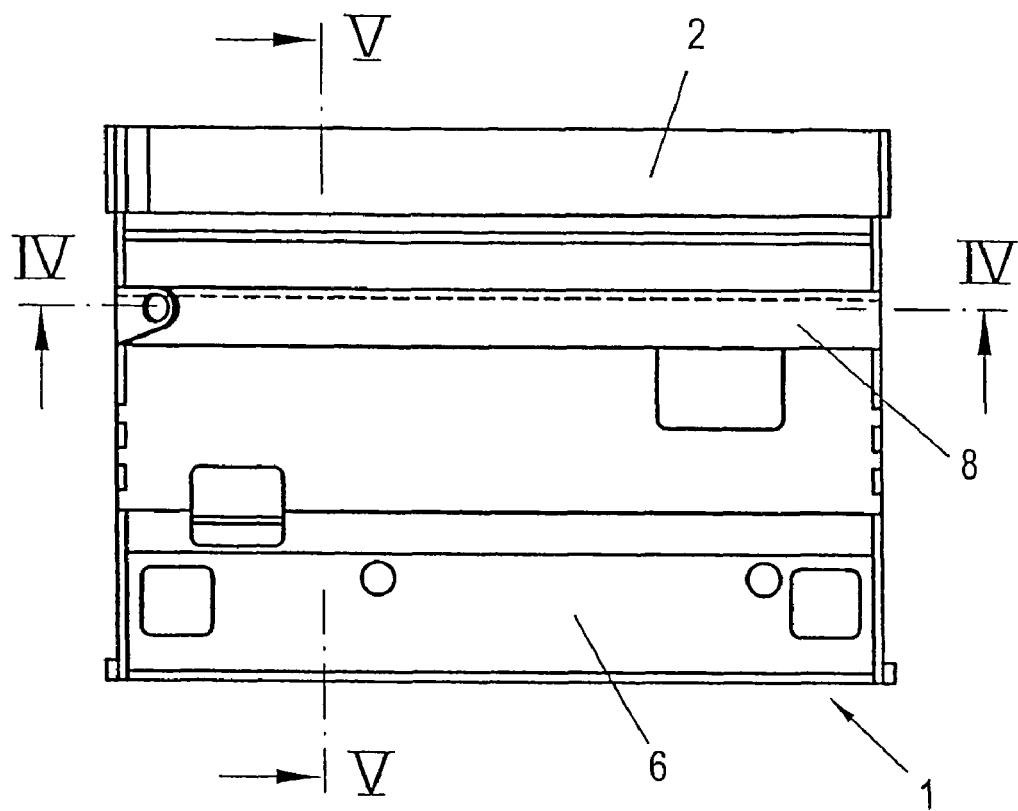
FIG. 3 shows the luggage stowage compartment according to FIG. 1, seen from above.
Figure 4:
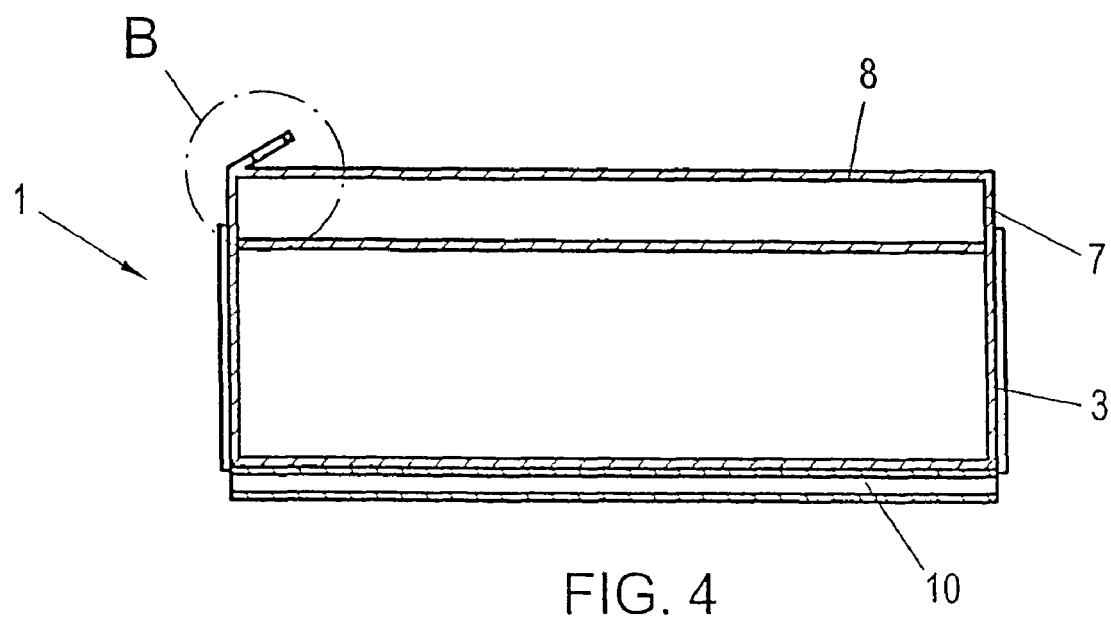
FIG. 4 shows a section through the luggage stowage compartment according to FIG. 3, along section line IV-IV.
Figure 5:
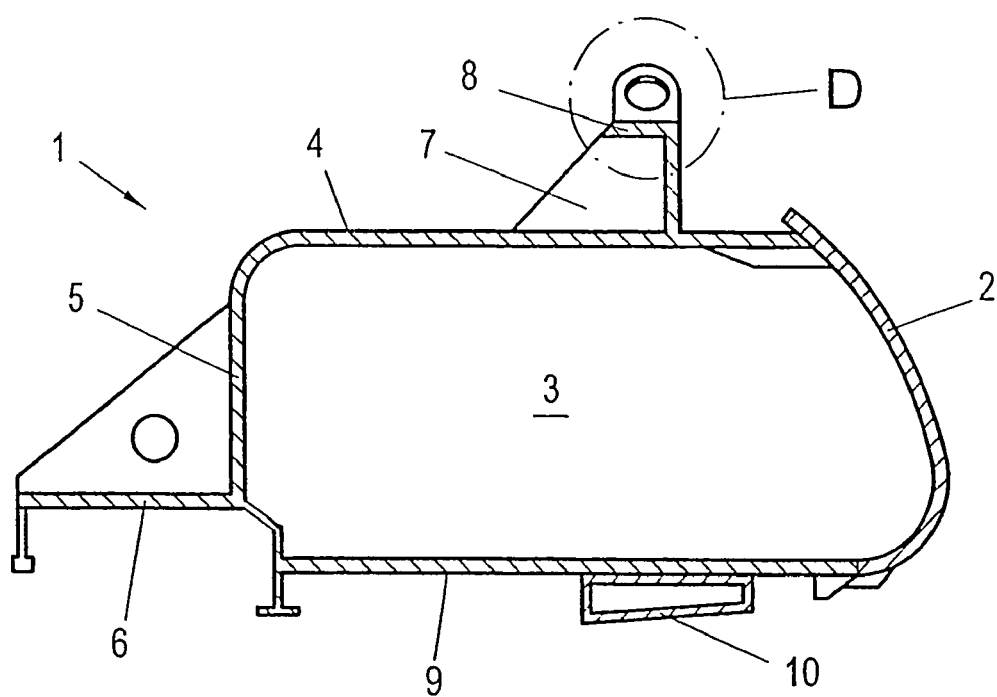
FIG. 5 shows a section through the luggage stowage compartment according to FIG. 3, along section line V-V.
Figure 7:
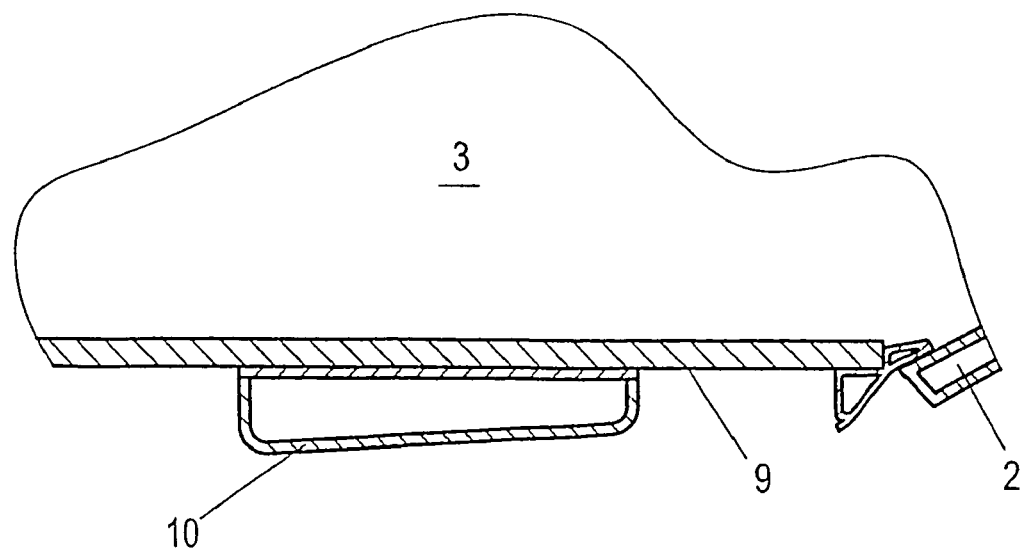
FIG. 7 shows a detailed view of the luggage stowage compartment in the region of the bottom ledge on an enlarged scale.
Figure 6:
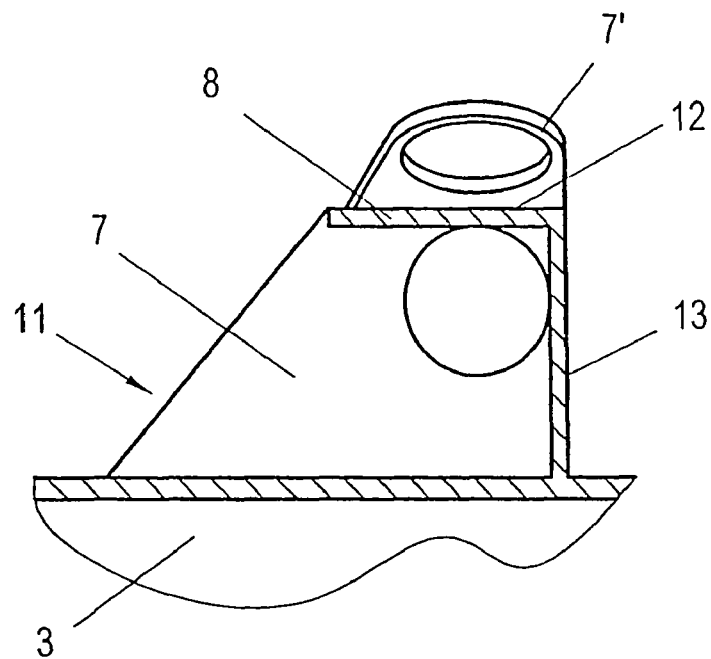
FIG. 6 shows detail D of FIG. 5, on an enlarged scale.
Figure 8:
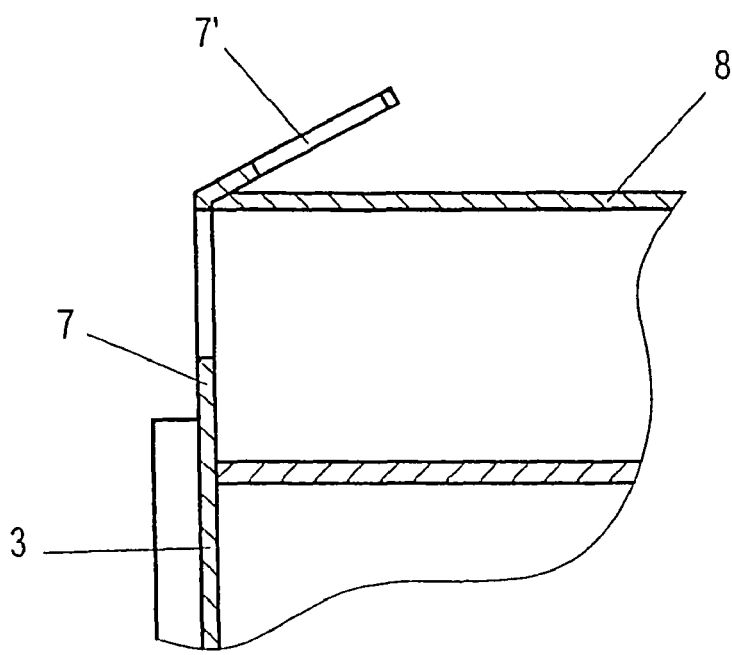
FIG. 8 shows detail B of FIG. 4, on an enlarged scale.

By a rapid acceleration or braking of the vehicle, in the present case of the aircraft during takeoff or during landing thereof, forces are created in the luggage stowage compartment 1 which are indicated by the arrows P in FIGS. 1 and 2 and which are distributed by the ledge 8 or the like, or by the bottom carrier 10 or the like, respectively, on the luggage stowage compartment 1 so that the structural integrity of the luggage stowage compartment 1 will remain ensured in case of an increased load. In any type of luggage stowage compartment 1, e.g. in bins for storing food, dishes, cutlery and other things, the same effect will be achieved, irrespective of the purpose for which such compartment is intended.

Within the scope of the invention, the luggage stowage compartment 1 may be constructed in various ways, e.g. open at its bottom, and closeable by a chute.

Adapted to the respective conditions, the measures according to the invention are also applicable in express trains, speedboats and other vehicles in which high differences in speed will occur.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A device for introducing forces into a luggage stowage compartment in a vehicle and for distributing the forces, comprising:
   a ceiling-side connecting element arranged between and connected to extensions of end-side side walls of the luggage stowage compartment,
   the extensions each being configured as an upwardly projecting bracket of the end-side side wall, each extension being arranged in a same plane as the respective end-side side wall of the luggage stowage compartment, and
   the connecting element being configured as a ledge having a fiber-reinforced synthetic material construction, the ledge being of L-shaped cross section and being fastened by an adhesive to a ceiling wall of the luggage stowage compartment in at least two locations thereof so as to be unshiftable in a longitudinal direction thereof; and
   a force-introducing element provided on the bracket of the side wall of the luggage stowage compartment, the force-introducing element being a bushing.

2. The device according to claim 1, wherein the connecting element is integrated in the luggage stowage compartment.

3. The device according to claim 1, further comprising a bottom carrier provided on a bottom side of the luggage stowage compartment for the distribution of the forces.

4. The device according to claim 1, wherein the connecting element has a fiber-glass-reinforced synthetic material construction.

5. The device according to claim 1, wherein the connecting element has a carbon-fiber-reinforced synthetic material construction.

6. The device according to claim 1, wherein the adhesive is a glue.

7. The device according to claim 1, wherein the ledge is fastened to a ceiling wall of the luggage stowage compartment.

8. A luggage stowage compartment for a vehicle, comprising:
   end-side side walls;
   a top wall;
   a bottom;
   a ceiling-side ledge configured to distribute forces transmitted to the compartment, the ledge having an L-shaped cross section, a fiber-reinforced synthetic material construction, and being adhered to the top wall and connected to the side walls,
   the side walls each including a bracket that is an extension of the side wall and that is arranged in a same plane as the respective end-side side wall of the luggage stowage compartment, the bracket projecting upward beyond the top wall and connecting to the ledge; and
   a force-introducing element provided on the bracket of the side wall of the luggage stowage compartment, the force-introducing element being a bushing.

9. The compartment according to claim 8, wherein the ledge has a carbon-fiber-reinforced synthetic material construction.

* * * * *